(12) United States Patent
Tsubota et al.

(10) Patent No.: US 6,507,502 B2
(45) Date of Patent: Jan. 14, 2003

(54) SNUBBER CIRCUIT AND POWER TRANSFORMER USING THE SAME

(75) Inventors: Yasuhiro Tsubota, Kyoto (JP); Hideki Kobori, Kyoto (JP); Katsuya Marumo, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/976,057

(22) Filed: Oct. 15, 2001

(65) Prior Publication Data

US 2002/0044459 A1 Apr. 18, 2002

(30) Foreign Application Priority Data

Oct. 17, 2000 (JP) ........................................ 2000-316633
Jun. 22, 2001 (JP) ........................................ 2001-189447

(51) Int. Cl.[7] ............................................ H02M 3/335
(52) U.S. Cl. ............................................ 363/16; 363/20
(58) Field of Search ............................ 363/16, 17, 19, 363/20, 131, 95, 96, 97, 132, 127, 56

(56) References Cited

U.S. PATENT DOCUMENTS

| | | | | |
|---|---|---|---|---|
| 4,805,079 A | * | 2/1989 | Van Buul | 363/56 |
| 5,260,607 A | * | 11/1993 | Kinbara | 307/253 |
| 5,410,467 A | * | 4/1995 | Smith et al. | 363/131 |
| 5,598,326 A | * | 1/1997 | Liu et al. | 363/34 |
| 5,636,114 A | * | 6/1997 | Bhagwat et al. | 363/56 |
| 6,061,254 A | * | 5/2000 | Takegami | 363/97 |

* cited by examiner

Primary Examiner—Rajnikant B. Patel
(74) Attorney, Agent, or Firm—Foley & Lardner

(57) ABSTRACT

The invention has a first series circuit consisting of a capacitor and a diode and a second series circuit consisting of a coil and a diode, the first series circuit is connected in parallel to the commutating diode in a state that the capacitor is connected to a choke coil side in the commutating diode, and the second series circuit is connected between a connecting portion of the capacitor and the diode in the first series circuit and a commutating diode non-connecting side in the choke coil.

10 Claims, 21 Drawing Sheets

FIG. 1
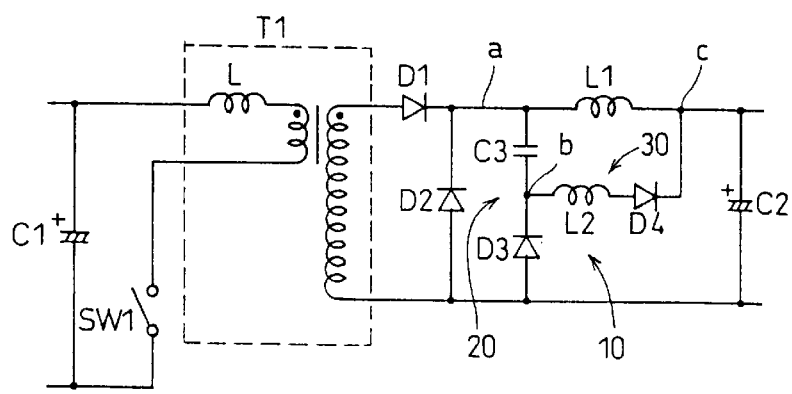
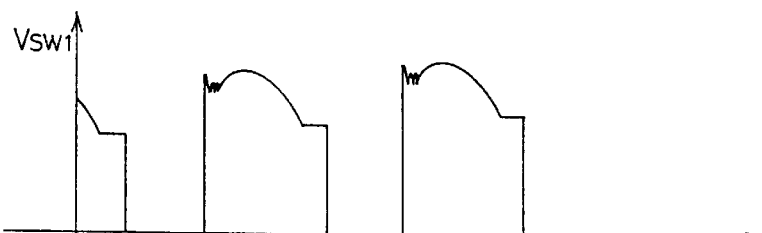
FIG. 2A
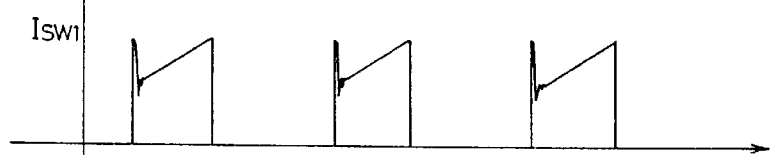
FIG. 2B
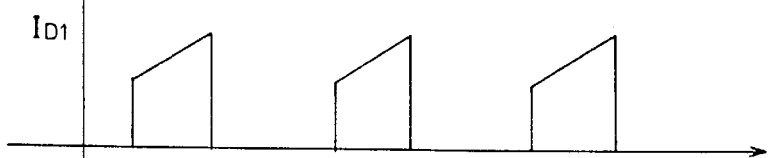
FIG. 2C
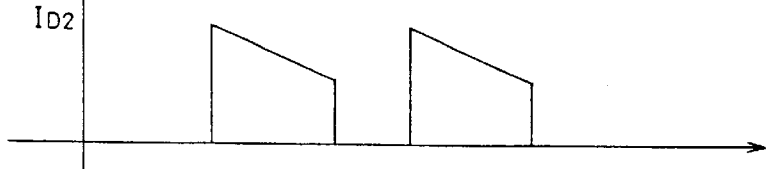
FIG. 2D (MODE 1)

(MODE 2)

F I G. 5
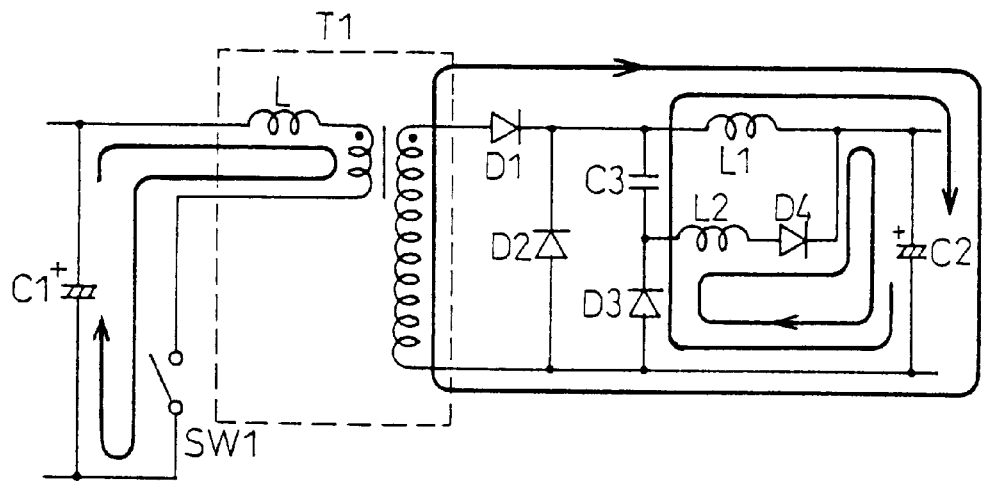
(MODE 3)
F I G. 6
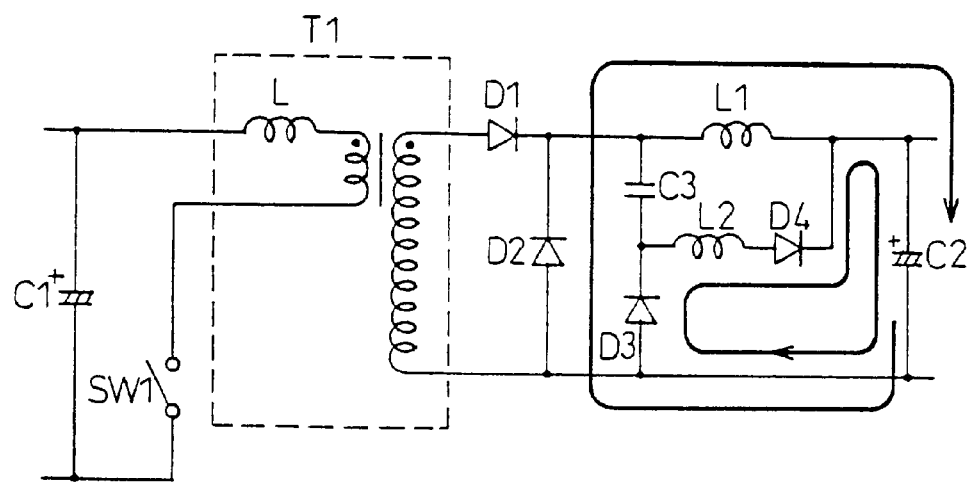
(MODE 4)

(MODE 5)

(MODE 6)

(MODE7)

(MODE 1)

(MODE 2)

(MODE 3)

(MODE 4)

(MODE 5)

(MODE 6)

(MODE 7)

FIG. 21
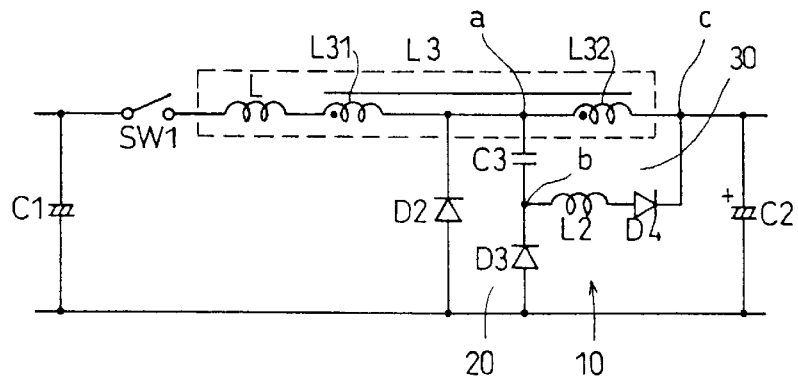
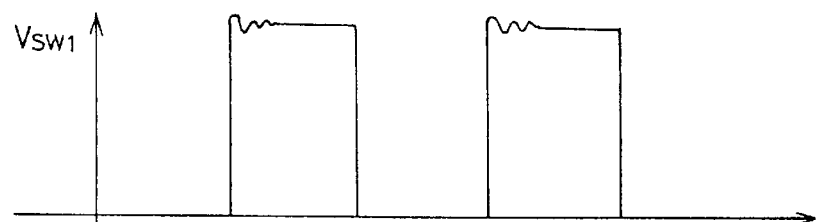
FIG. 22A
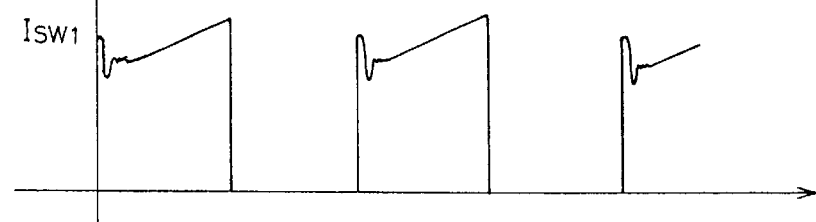
FIG. 22B
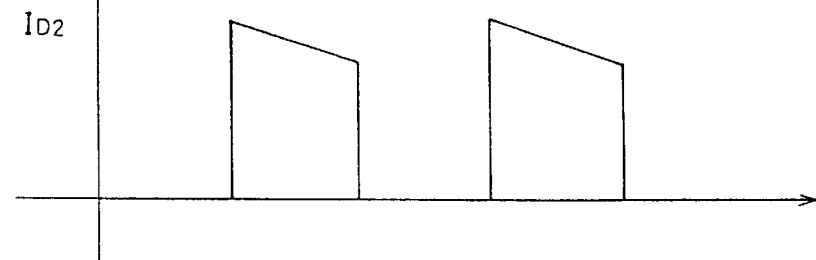
FIG. 22C (MODE 1)

(MODE 2)

F I G. 25
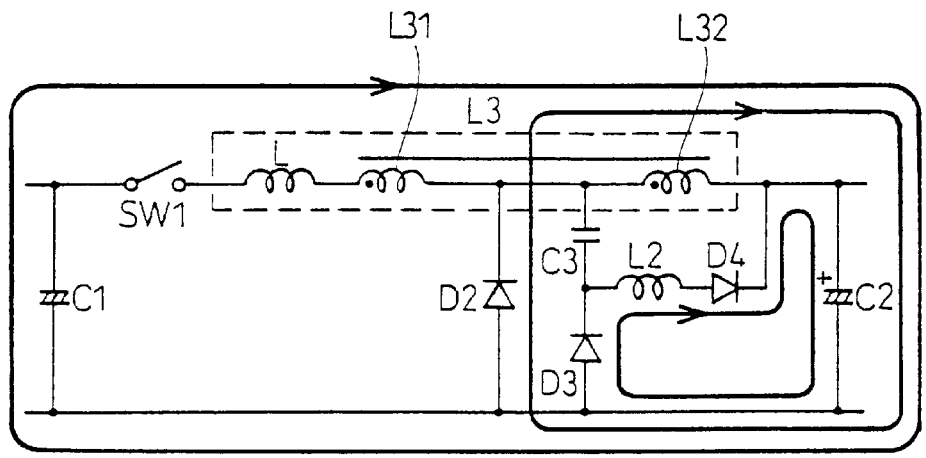
(MODE 3)
F I G. 26
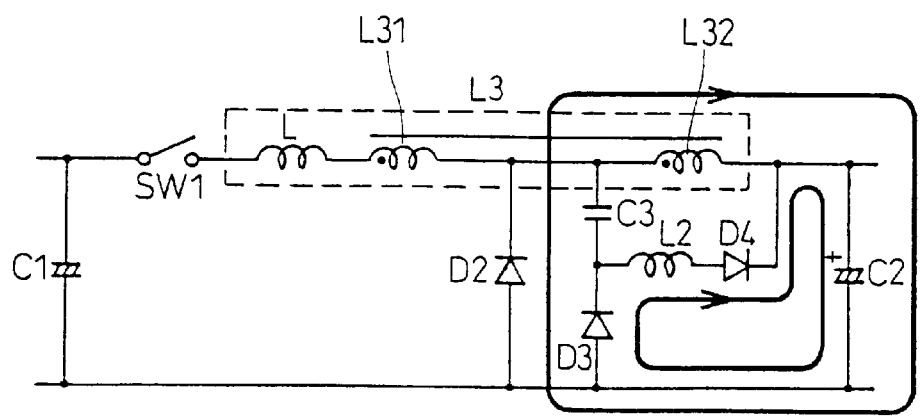
(MODE 4)

F I G. 27
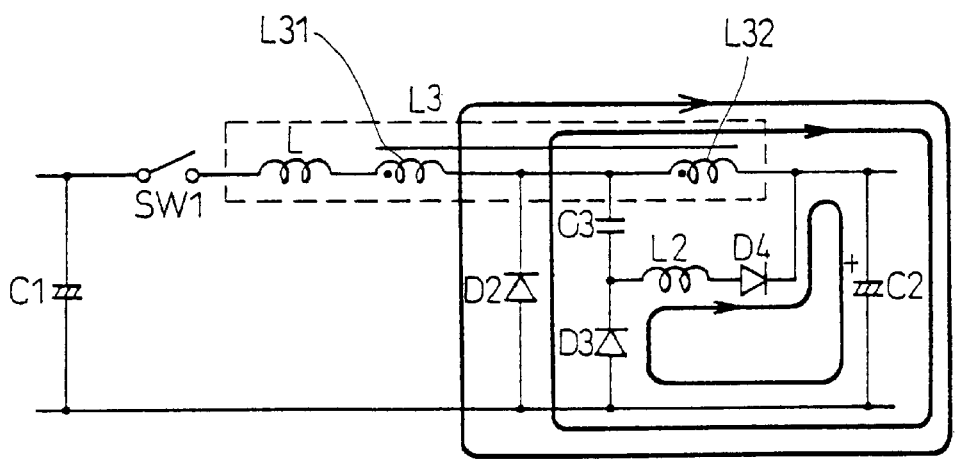
(MODE 5)
F I G. 28
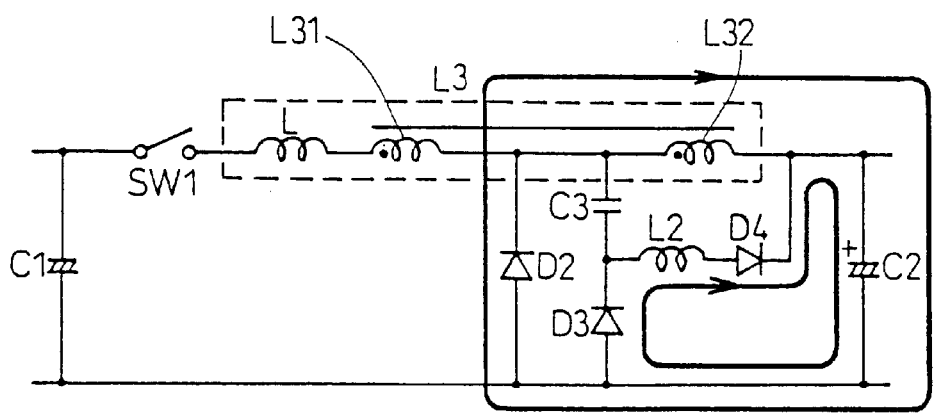
(MODE 6)

F I G. 29
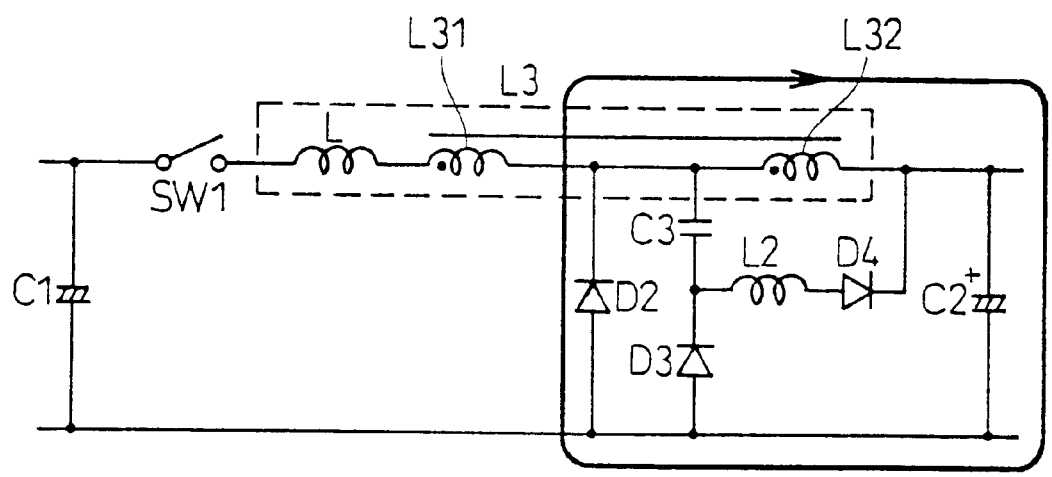
(MODE 7)

F I G. 34
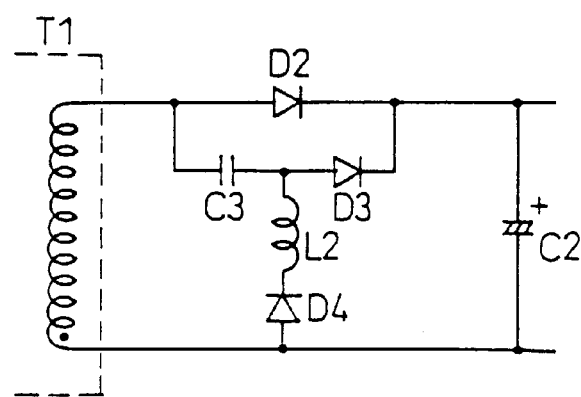
F I G. 35
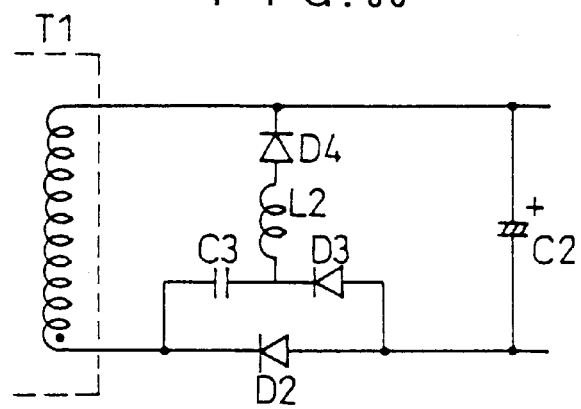
F I G. 36
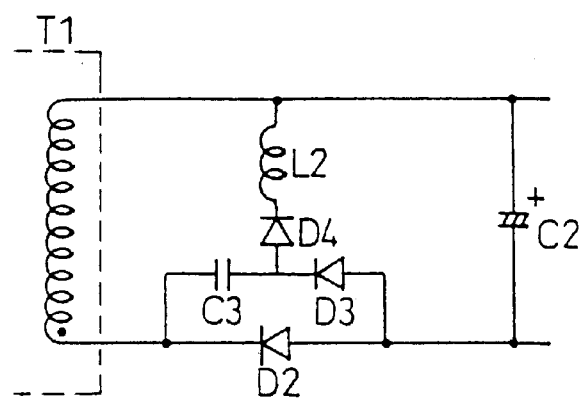

F I G. 37
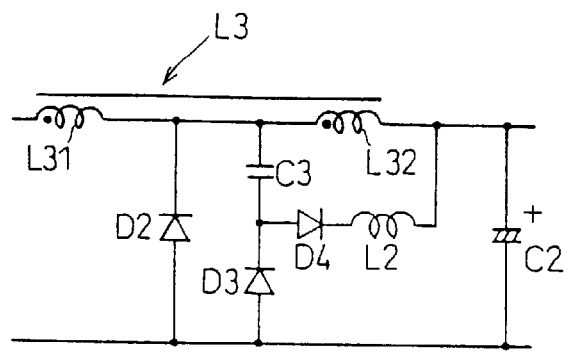
F I G. 38
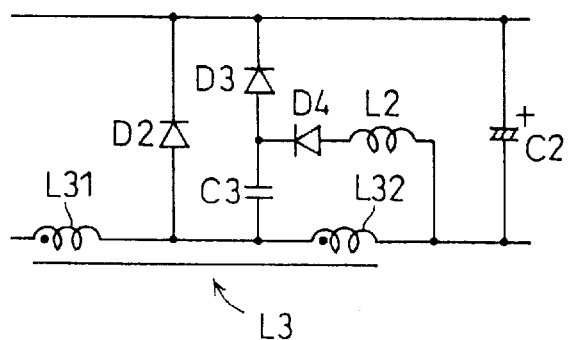
F I G. 39
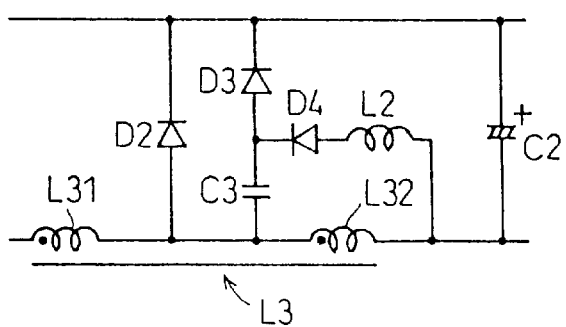

SNUBBER CIRCUIT AND POWER TRANSFORMER USING THE SAME

BACKGROUND OF THE INVENTION

1. Field of the Invention

The present invention relates to a snubber circuit for suppressing a voltage ringing at a time of a turn-off of a switch element and a power transformer such as a switching power supply, using the snubber circuit.

2. Description of the Related Art

Examples of power transformers include switching power supplies of both insulated types using a converter transformer and non-insulated types using no converter transformer.

In both types of switching power supplies, a switch element experiences sudden voltage changes (a voltage ringing phenomenon) at a time of a turn-off of the switch element due to a leakage inductance of a choke coil or a primary coil of the converter transformer.

A snubber circuit is provided for mainly suppressing the voltage ringing.

The voltage ringing at the time of the turn-off of the switch element is especially large if the switching power supply has the large leakage inductance in the primary coil of the converter transformer. Therefore, it is preferred that the snubber circuit can suppress the voltage ringing more efficiently.

However, when the leakage inductance is large, suppressing voltage ringing with a conventional snubber circuit has resulted in huge power loss.

SUMMARY OF THE INVENTION

Accordingly, a primary object of the invention is to provide a snubber circuit capable of efficiently suppressing a voltage ringing at a time of a turn-off of a switch element while keeping an energy loss to a sufficiently low level.

Other objects, features, and advantages of the invention would be obvious from the following description.

The present invention is, in summary, a snubber circuit provided in a power transformer including at least: a switch element for operating for a power transformation control; a magnetic substance for a storing and releasing energy in relation to power transformation accompanying with an operation of the switch element; and a commutating diode for conducting by means of the energy stored in the magnetic substance, the snubber circuit including: a first series circuit composed of a capacitor and a diode connected in series; and a second series circuit composed of a coil and a diode connected in series, wherein the first series circuit is connected in parallel with the commutating diode in a state that the capacitor is connected to the magnetic substance side in the commutating diode; and the second series circuit is connected between a connecting portion between the capacitor and the diode in the first series circuit and a commutating diode non-connecting side in the magnetic substance.

The power transformers mentioned above include not only switching power supplies, but also other kinds of power transformers such as inverters.

The switch elements include not only switching transistors such as bipolar transistors and MOS transistors, but also other kinds of switch elements.

The magnetic substance mentioned above include any magnetic substance such as a secondary coil of a transformer, a choke coil and other magnetic components, which stores and releases energy as a result of operation of a switch element.

The commutating diodes include diodes which conduct by means of stored energy of a magnetic substance, for example, a rectifying diode disposed in the secondary side of a transformer in a flyback switching power supply and a commutating diode in the secondary side of a transformer in a forward switching power supply.

In the first series circuit, the capacitor and the diode include any aspects connected in series whether directly or indirectly.

An aspect in which the first series circuit is connected to the commutating diode in parallel includes any aspects connected in parallel whether directly or indirectly.

An aspect in which the capacitor within the first series circuit is connected to the magnetic substance connecting side in the commutating diode includes any aspects connected to either an anode side or cathode side of the commutating diode whether directly or indirectly.

A connecting portion of a capacitor and a diode in the first series circuit includes any aspects in which the capacitor and the diode connected whether directly or indirectly.

In the second series circuit, the coil and the diode include any aspects connected in series whether directly or indirectly.

An aspect in which the second series circuit is connected to a commutating diode non-connecting side in the magnetic substance includes any aspects connected to the commutating diode non-connecting side of the magnetic substance whether directly or indirectly.

In accordance with the snubber circuit of the invention, in a state that the energy is fully stored in the capacitor of the first series circuit, when the switch element is turned off, since the stored energy of the capacitor is released through the magnetic substance, an electric current of the switch element doesn't rapidly become smaller, but gradually becomes smaller.

Consequently, the voltage ringing at a time of a turn-off of the switch element is suppressed.

In this case, even if the coil used for power transformation in a switching power supply employing a converter transformer, the switching power supply employing a tapped inductor and the like has a large leakage inductance, since a component is formed by a capacitor, diode and coil, enhancing voltage ringing suppression effects does not cause power loss.

As mentioned above, according to the invention, the voltage ringing at the time of the turn-off of the switch element can be suppressed while considerably suppressing the power loss.

A power transformer in accordance with the invention, includes: a switch element for operating for a power transformation control; a magnetic substance for storing and releasing an electrical energy in relation to the power transformation that accompanies operation of the switch element; a commutating diode for conducting by means of the stored energy of the magnetic substance; and a snubber circuit for suppressing voltage variations at a time of a turn-off of the switch element, wherein the snubber circuit has a first series circuit of a capacitor and a diode and a second series circuit of a coil and a diode, the first series circuit is connected in parallel to the commutating diode in a state that the capacitor is connected to a magnetic substance connecting side in the commutating diode, and the second series circuit is connected between a connecting portion of the capacitor and the diode in the first series circuit and a commutating diode non-connecting side in the magnetic substance.

According to the power transformer in accordance with the invention, since the snubber circuit is used, a suppression of the voltage ringing at the time of the turn-off of the switch element and a power loss accompanying the suppression thereof can be considerably reduced.

BRIEF DESCRIPTION OF THE DRAWINGS

These and other objects as well as advantages of the invention will become clear by the following description of preferred embodiments of the invention with reference to the accompanying drawings, wherein:

FIG. 1 is a circuit diagram showing a main part of a switching power supply in accordance with a preferred embodiment of the invention;

FIG. 2A is a voltage waveform diagram of a switch element SW1 in the switching power supply shown in FIG. 1;

FIG. 2B is a current waveform diagram of the switch element SW1 in the switching power supply shown in FIG. 1;

FIG. 2C is a current waveform diagram of a rectifying diode D1 in the switching power supply shown in FIG. 1;

FIG. 2D is a current waveform diagram of a commutating diode D2 in the switching power supply in FIG. 1:

FIG. 5 is a circuit diagram showing a major part of a switching power supply being subjected to a description of a current behavior in each portion;

FIG. 6 is a circuit diagram showing a major part of a switching power supply being subjected to a description of a current behavior in each portion;

FIG. 21 is a circuit diagram showing a major part of a switching power supply in accordance with a further preferred embodiment of the invention;

FIG. 22A is a voltage waveform diagram of a switch element SW1 in the switching power supply shown in FIG. 21;

FIG. 22B is a current waveform diagram of the switch element SW1 in the switching power supply shown in FIG. 21;

FIG. 22C is a current waveform diagram of a commutating diode D2 in the switching power supply shown in FIG. 21;

FIG. 25 is a circuit diagram showing a major part of a switching power supply being subjected to a description of a current behavior in each portion;

FIG. 26 is a circuit diagram showing a major part of a switching power supply being subjected to a description of a current behavior in each portion;

FIG. 27 is a circuit diagram showing a major part of a switching power supply being subjected to a description of a current behavior in each portion;

FIG. 28 is a circuit diagram showing a major part of a switching power supply being subjected to a description of a current behavior in each portion;

FIG. 29 is a circuit diagram showing a major part of a switching power supply being subjected to a description of a current behavior in each portion;

FIG. 34 is a circuit diagram showing a major part of a switching power supply in accordance with another further preferred, embodiment of the invention;

FIG. 35 is a circuit diagram showing a major part of a switching power supply in accordance with another further preferred embodiment of the invention;

FIG. 36 is a circuit diagram showing a major part of a switching power supply in accordance with another further preferred embodiment of the invention;

FIG. 37 is a circuit diagram showing a major part of a switching power supply in accordance with another further preferred embodiment of the invention;

FIG. 38 is a circuit diagram showing a major part of a switching power supply in accordance with another further preferred embodiment of the invention; and FIG. 39 is a circuit diagram showing a major part of a switching power supply in accordance with another further preferred embodiment of the invention.

In all these figures, like components are indicated by the same numerals.

DETAILED DESCRIPTION OF PREFERRED EMBODIMENTS

Figure 3:
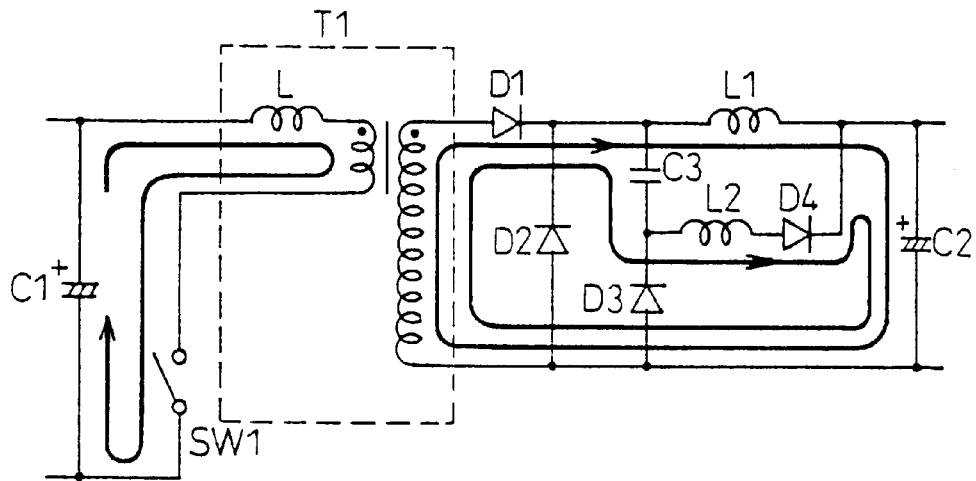
FIG. 3 is a circuit diagram showing a main part of a switching power supply being subjected to a description of a current behavior in each portion.
Figure 4:
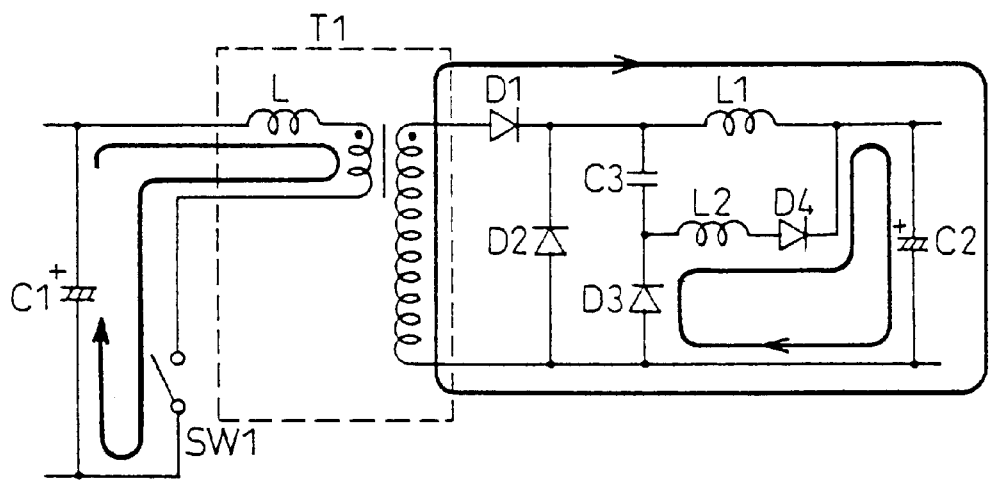
FIG. 4 is a circuit diagram showing a major part of a switching power supply being subjected to a description of a current behavior in each portion.
Figure 7:
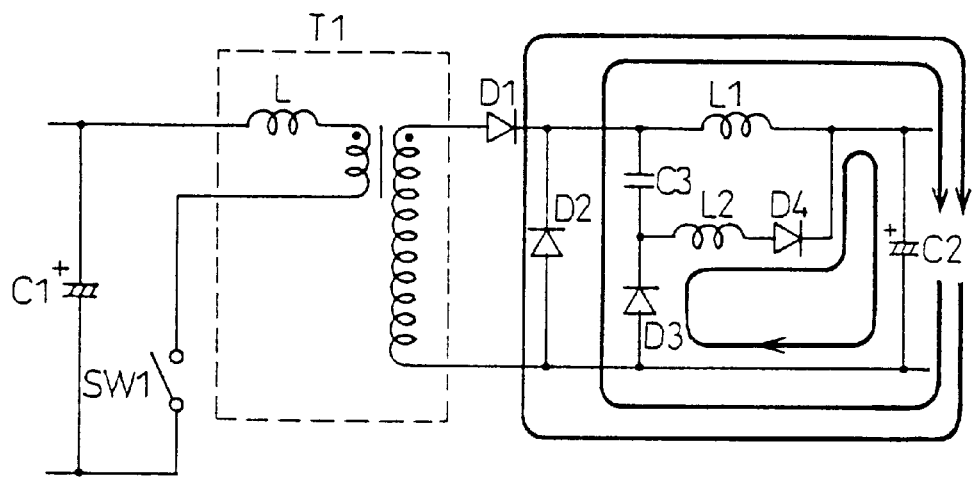
FIG. 7 is a circuit diagram showing a major part of a switching power supply being subjected to a description of a current behavior in each portion.
Figure 8:
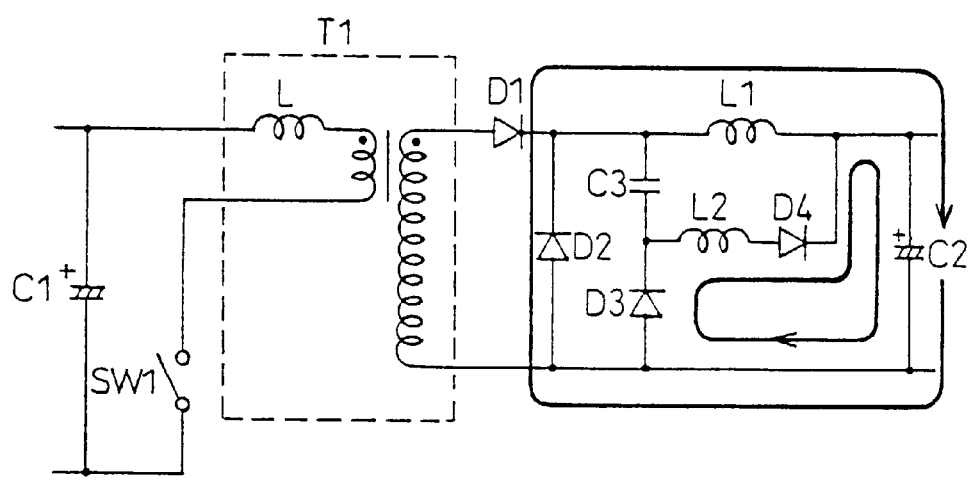
FIG. 8 is a circuit diagram showing a major part of a switching power supply being subjected to a description of a current behavior in each portion.
Figure 9:
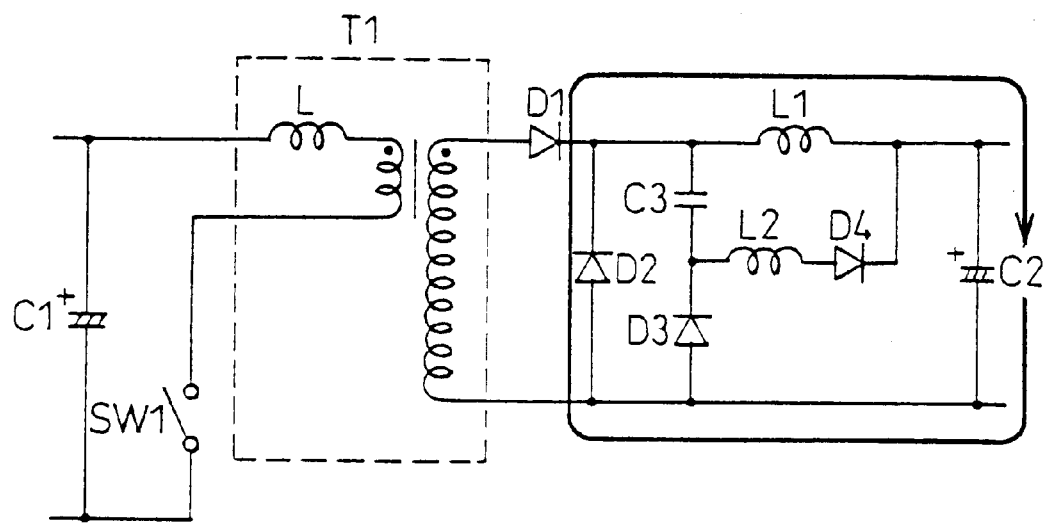
FIG. 9 is a circuit diagram showing a major part of a switching power supply being subjected to a description of a current behavior in each portion.
Figure 10:
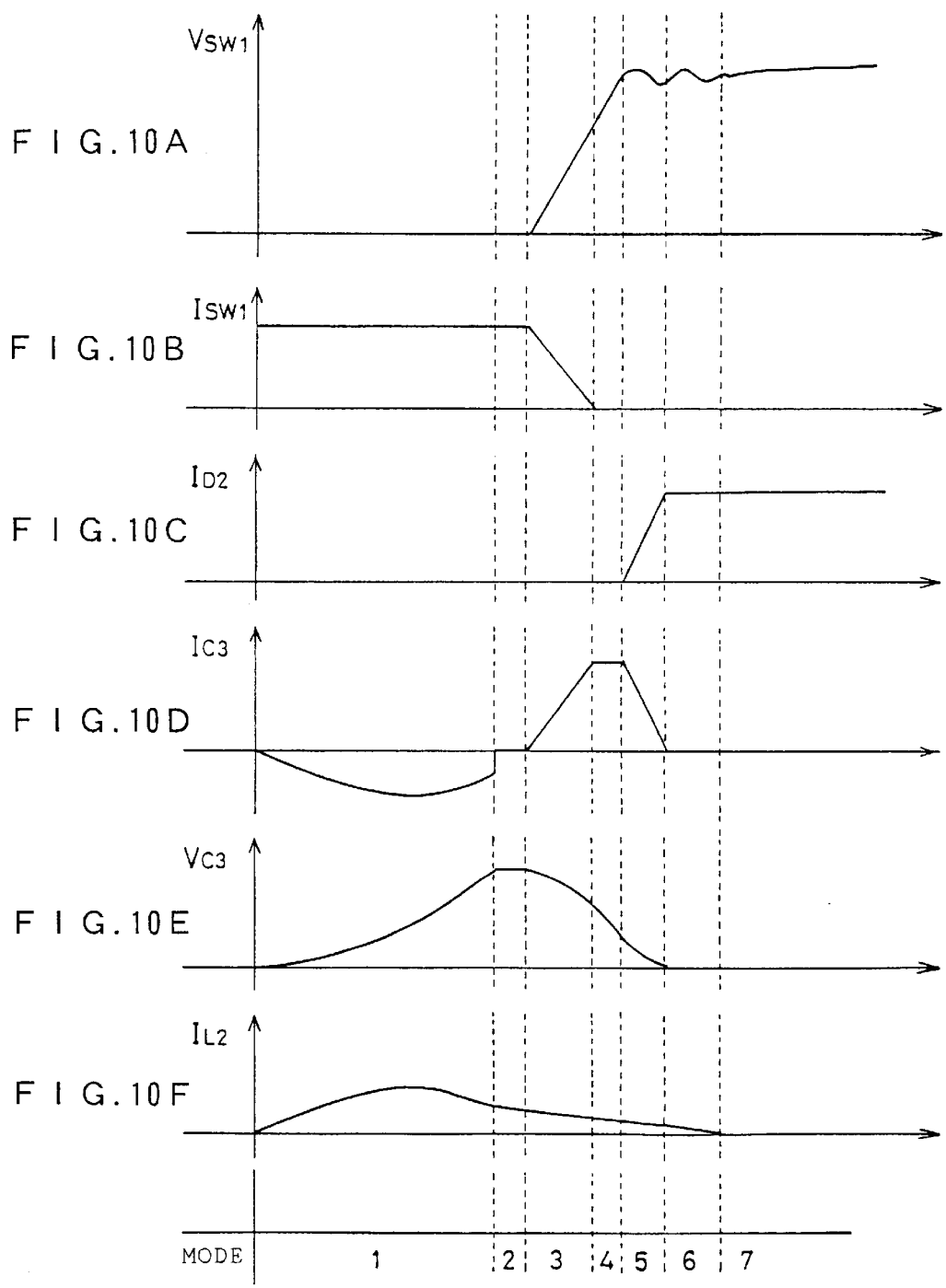
FIG. 10A is a voltage waveform diagram of a switch element SW1 shown in FIGS. 3 to 9.
FIG. 10B is a current waveform diagram of the switch element SW1 shown in FIGS. 3 to 9.
FIG. 10C is a current waveform diagram of a commutating diode D2 shown in FIGS. 3 to 9.
FIG. 10D is a current waveform diagram of a capacitor C3 shown in FIGS. 3 to 9.
FIG. 10E is a voltage waveform diagram of the capacitor C3 shown in FIGS. 3 to 9.
FIG. 10F is a current waveform showing of a coil L2 shown in FIGS. 3 to 9.
Figure 11:
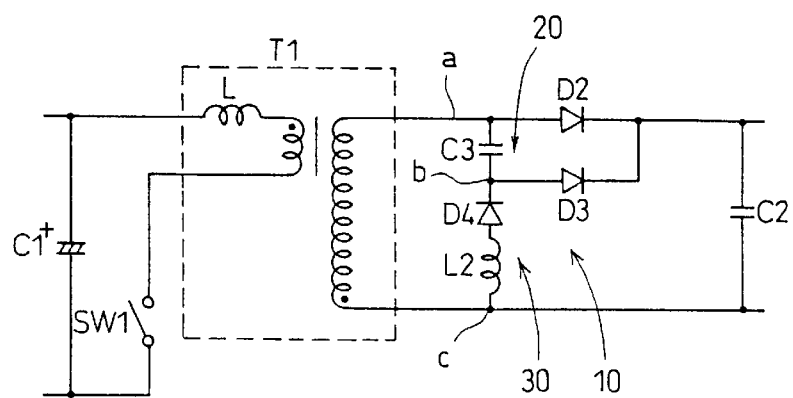
FIG. 11 is a circuit diagram showing a major part of a switching power supply of another preferred embodiment of the invention.

A switching power supply having a snubber circuit in accordance with a preferred embodiment of the invention will be described with reference to FIGS. 1 to 10. The switching power supply is of a forward scheme as one example of a power transformer.

Referring to FIG. 1, a primary side smoothing capacitor C1 smoothes a full wave rectified voltage applied thereacross. A converter transformer T1 includes a primary coil and a secondary coil while a leakage inductance in the converter transformer T1 is especially indicated by L. A switch element SW1 is formed by a transistor and connected in series to the primary coil of the converter transformer T1 to be switched on and off for a power transformation control.

A rectifying diode D1 is connected at an anode thereof to an end of the secondary coil of the converter transformer T1. A choke coil L1 is connected in series to a cathode of the rectifying diode D1. In other words, the choke coil L1 is indirectly connected to the secondary coil of the converter transformer T1 through the rectifying diode D1. The choke coil L1 functions as a smoothing magnetic substance by storing energy at a time of a turn-on of the switch element Si and releasing the energy at a time of a turn-off of the switch element S1.

A commutating diode D2 is connected to a connecting portion of the rectifying diode D1 and the choke coil L1. The commutating diode D2 functions as a diode which releases the energy stored in the choke coil L1. A secondary side smoothing capacitor C2 is connected in parallel to the choke coil L1 and the secondary coil of the converter transformer T1.

The operation of the forward scheme switching power supply essentially structured in the above manner is well-known and therefore detailed description is omitted here. In this case, the switching power supply is of a circuit scheme carrying out power transformation for obtaining a stable current or voltage and typically includes a detecting circuit of an output voltage or a controller circuit stably controlling an output voltage at a constant value through the control of the switch-on and -off cycle of the switch element SW1 in accordance with the detected voltage, however, these circuits are not shown in the figures in the present embodiment.

A snubber circuit 10 includes a first series circuit 20 of a capacitor C3 and a diode D3 and a second series circuit 30 of a coil L2 and a diode D4.

The first series circuit 20 is connected in parallel to the commutating diode D2. In the first series circuit 20, the capacitor C3 is connected to a choke coil connecting side (magnetic substance connecting side) "a" in the commutating diode D2. In this case, the choke coil connecting side "a" corresponds to the cathode side of the commutating diode D2.

The second series circuit 30 is connected between a connecting portion "b" of the capacitor C3 and the diode D3 in the first series circuit 20 and a commutating diode non-connecting side "c" in the choke coil L1.

Referring to FIGS. 2A to 2D, in voltage and current waveforms with a switch-on and -off of the switch element SW1, a voltage $V_{SW1}$ of the switch element SW1 varies as shown in FIG. 2A. A current Is, of the switch element SW1 varies as shown in FIG. 2B. A current $I_{D1}$ of the rectifying diode D1 varies as shown in FIG. 2C. A current $I_{D2}$ of the commutating diode D2 varies as shown in FIG. 2D.

Referring to FIG. 3 and FIGS. 10A to 10F, the a suppression of voltage ringing at a time of a switch-off of the switching device SW1 is described in terms of mode 1 to mode 7.

In each mode, the sense of a current flow is indicated by an arrow.

FIG. 10A shows the voltage $V_{SW1}$ (collector voltage) applying to the switch element SW1, FIG. 10B shows the current $I_{SW1}$ flowing into the switch element SW1, FIG. 10C shows the current $I_{D2}$ flowing into the commutating diode D2, FIG. 10D shows the current $I_{C3}$ flowing into the capacitor C3, FIG. 10E shows the voltage $VC_{C3}$ applying to the capacitor C3, and FIG. 10F shows the current $I_{D2}$ flowing into the coil L2.

(Mode 1)

In mode 1, as shown in FIG. 3 and FIGS. 10A to 10F, the switch element SW1 is turned on at the start of mode 1. Since the switch element SW1 conducts, the voltage $I_{SW1}$ thereof is approximately zero and the current $I_{SW1}$ thereof is approximately constant at a predetermined value.

The current $I_{D2}$ of the commutating diode D2 is zero.

The current $I_{C3}$ of the capacitor C3 increases to a negative side during a period that the stored energy amount of the capacitor C3 from start to halfway of mode 1 is small, turns to decreasing in the course of increasing the stored energy, and stops flowing when the stored energy of the capacitor C3 is full at an end of mode 1.

The voltage $VC_3$ of the capacitor C3 increases to positive until the end of mode 1, and the current $I_{L2}$ of the coil L2 increases and then turns to decreasing in halfway.

Current flows to the smoothing capacitor C2 via a first path consisting of the secondary coil of the converter transformer T1, the rectifying diode D1 and the choke coil L1, and a second path consisting of that secondary coil, the capacitor C3, the coil L2 and the diode D4.

(Mode 2)

In mode 2, as shown in FIG. 4 and FIGS. 10A to 10F, the voltage $V_{SW1}$ and current $I_{SW1}$ of the switch element SW1 and the current $I_{D2}$ of the commutating diode D2 do not change at all. Since the capacitor C3 is already stored the energy and in a full charged state, the current $I_{C3}$ does not flow in, whereby the voltage $VC_3$ of the capacitor C3 is approximately constant. While the coil L2 flows the current $I_{L2}$ as a power source by the stored thereof even if the current is cut off from the capacitor C3, the current $I_{L2}$ gradually decreases due to the decreasing of the energy thereof.

Current flows to the smoothing capacitor C2 via a first path consisting of the secondary coil of the converter transformer T1, the rectifying diode D1 and the choke coil L1, and a second path consisting of the diode D3, the coil L2, and the diode D4.

(Mode 3)

As shown in FIG. 5 and FIGS. 10A to 10F, when mode 3 is started, the switch element SW1 is turned off. Due to the turn-off, the voltage $V_{SW1}$ of the switch element SW1 starts to increasing while the current $I_{SW1}$ thereof starts to decreasing.

A current continues to flow into the choke coil L1 even when starting of mode 3. Further, the commutating diode D2 does not conduct throughout mode 3, with the current $I_{D2}$ equal to zero.

Under the conditions, as the switch element SW1 is turned off, the voltage of the secondary coil of the converter transformer T1 becomes to decreasing. As a result, the voltage stored in the capacitor C3 is more higher, so that the current $I_{C3}$ flows from the capacitor C3 into choke coil L1. The current $I_{C3}$ continues to increase gradually until the end of mode 3.

Since the current $I_{C3}$ is gradually increased, the current $I_{SW1}$ of the switch element SW1 is gradually and smoothly decreased throughout mode 3. Accordingly, a ringing of the voltage $V_{SW1}$ of the switch element SW1 is suppressed in mode 3.

Current flows to the smoothing capacitor C2 via a first path consisting of the secondary coil of the converter transformer T1, the rectifying diode D1 and the choke coil L1, a second path consisting of the diode D3, the capacitor C3 and the choke coil L1, and a third path consisting of the diode D3, the coil L2 and the diode D4.

(Mode 4)

Referring to FIG. 6 and FIGS. 10A to 10F, although the switch element SW1 is in the course of turn-off from start to first half of mode 4, a current does not become to flowing into the choke coil L1 through the rectifying diode D1.

Although The current $I_{C3}$ from the capacitor C3 flows into the choke coil L1, the current $I_{C3}$ is almost constant throughout mode 4. Accordingly, the current $I_{D2}$ does not also flow into the commutating diode D2 throughout mode 4.

A current flows to the smoothing capacitor C2 via a first path consisting of the diode D3, the capacitor C3 and the choke coil L1, and a second path consisting of the diode D3, the coil L2 and the diode D4.

(Mode 5)

In mode 5, as shown in FIG. 7 and FIGS. 10A to 10F, the current from the capacitor C3 starts decreasing, so that the commutating diode D2 conducts to set the choke coil L1 as a current source, whereby the current $I_{D2}$ starts to flow.

A current flows to the smoothing capacitor C2 via a first path consisting of the commutating diode D2 and the choke coil L1, a second path consisting of the diode D3, the capacitor C3 and the choke coil L1, and a third path consisting of the diode D3, the coil L2 and the diode D4.

(Mode 6)

In mode 6, as shown in FIG. 8 and FIGS. 10A to 10F, the current $I_{CS}$ from the capacitor C3 does not become to flow and the current $I_{D2}$ flowing into the commutating diode D2 is also approximately-constant.

A current flows to the smoothing capacitor C2 via a first path consisting of the commutating diode D2 and the choke coil L1, and a second path consisting of the diode D3, the coil L2 and the diode D4.

(Mode 7)

In mode 7, as shown in FIG. 9 and FIGS. 10A to 10F, the voltage $V_{SW1}$ of the switch element SW1 is also stable.

A current flows to the smoothing capacitor C2 via a path consisting of the commutating diode D2 and the choke coil L1.

In modes 1 to 7 mentioned above, in the case of the embodiment of the invention, since the current $I_{SW1}$ of the switch element SW1 gradually decreases in mode 3 at the time of the turn-off of the switch element SW1, a voltage ringing at the time of the turn-off of the switch element SW1 is suppressed even if the primary coil of the converter transformer T1 has a large leakage inductance.

In addition, since the snubber circuit 10 is formed by the capacitor C3, the diodes D3 and D4, and the coil L2, an energy loss in the snubber circuit 10 can approximately be prevented.

The snubber circuit 10 is provided in the secondary side of the switching power supply, thereby employing components in which a rated voltage and a shape dimension are small.

Referring to FIGS. 11 to 20, when a fly-back switching power supply in accordance with another preferred embodiment of the invention is described, the switching power supply is provided with a snubber circuit 10. Like the embodiment mentioned above, the snubber circuit has a first series circuit 20 consisting of a capacitor C3 and a diode D3, and a second series circuit 30 consisting of a coil L2 and a diode D4.

The first series circuit 20 is connected in parallel to the commutating diode D2.

In the first series circuit 20, the capacitor C3 is connected to a secondary coil connecting side (magnetic substance connecting side) "a" of the converter transformer T1 in the commutating diode D2.

The second series circuit 30 is connected between a connecting portion "b" of the capacitor C3 and the diode D3 in the first series circuit 20, and a commutating diode non-connecting side "c" in the secondary coil as a magnetic substance.

Figure 12A:
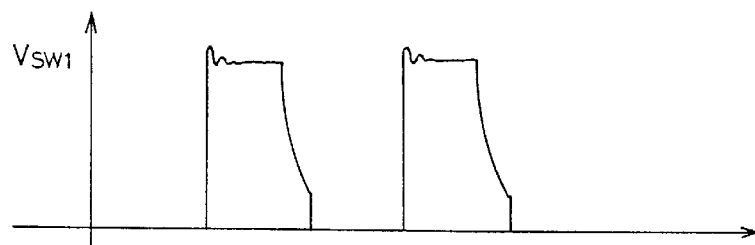
FIG. 12A is a voltage waveform diagram of a switch element SW1 in the switching power supply shown in FIG. 11.
Figure 12B:
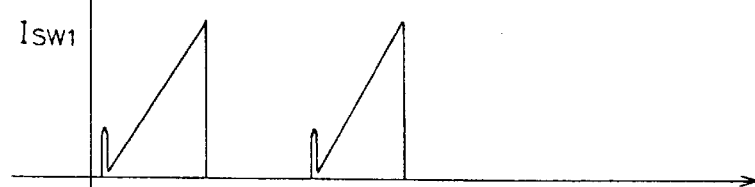
FIG. 12B is a current waveform diagram of the switch element SW1 the switching power supply shown in FIG. 11.
Figure 12C:
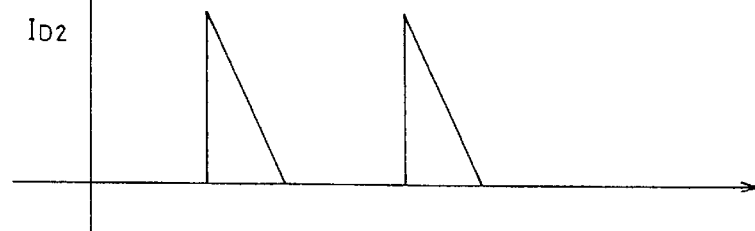
FIG. 12C is a current waveform diagram of a commutating diode D2 in the switching power supply shown in FIG. 11.
Figure 13:
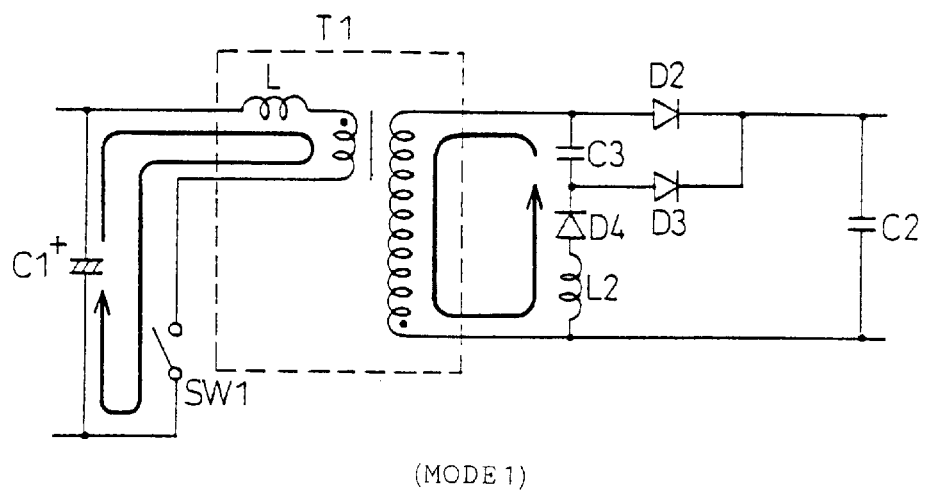
FIG. 13 is a circuit diagram showing a major part of a switching power supply being subjected to a description of a current behavior in each portion.
Figure 14:
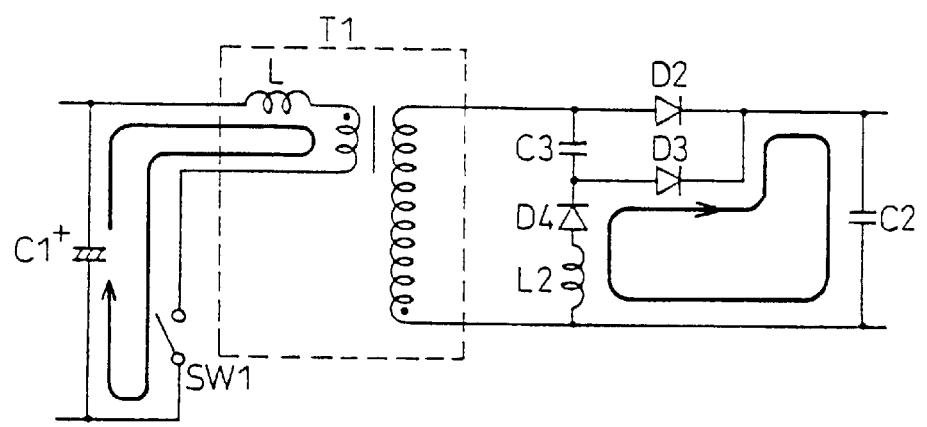
FIG. 14 is a circuit diagram showing a major part of a switching power supply being subjected to a description of a current behavior in each portion.
Figure 15:
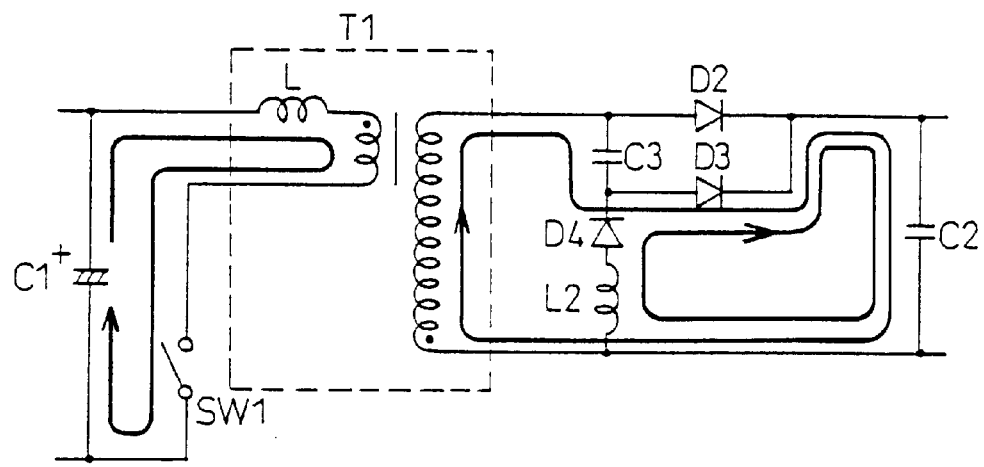
FIG. 15 is a circuit diagram showing a major part of a switching power supply being subjected to a description of a current behavior in each portion.
Figure 16:
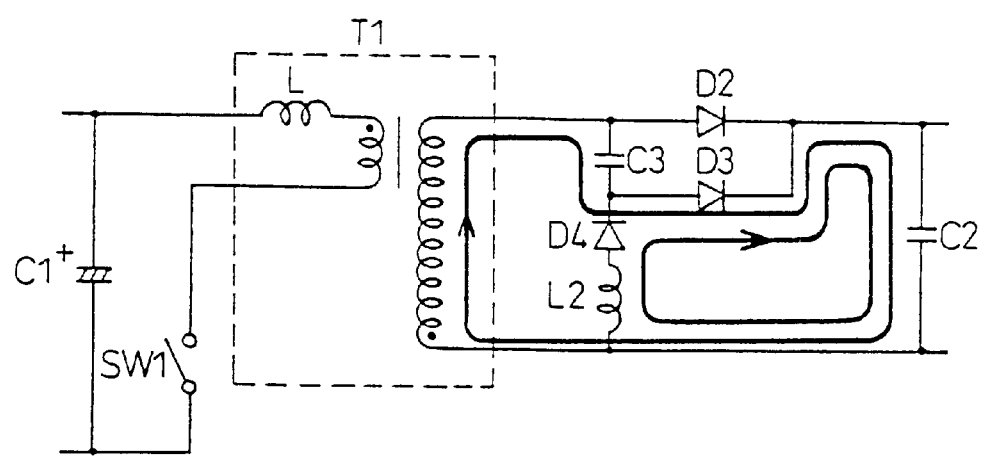
FIG. 16 is a circuit diagram showing a major part of a switching power supply being subjected to a description of a current behavior in each portion.
Figure 17:
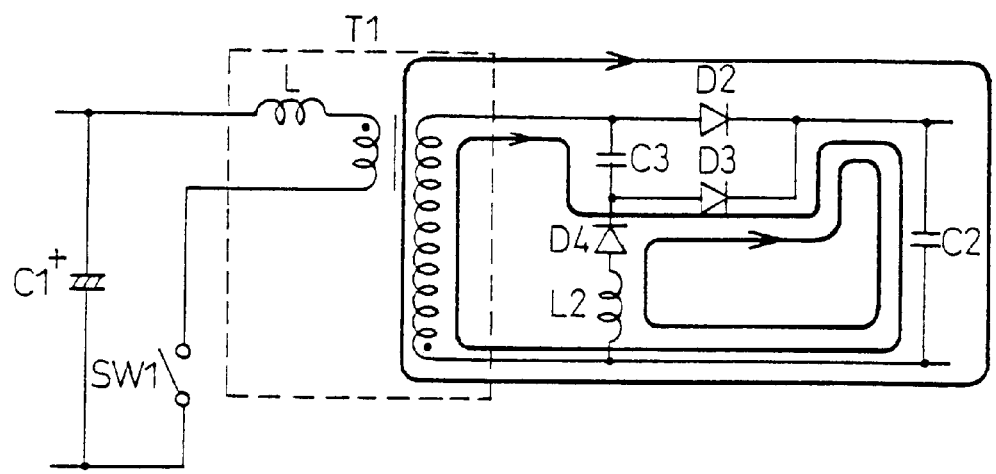
FIG. 17 is a circuit diagram showing a major part of a switching power supply being subjected to a description of a current behavior in each portion.
Figure 18:
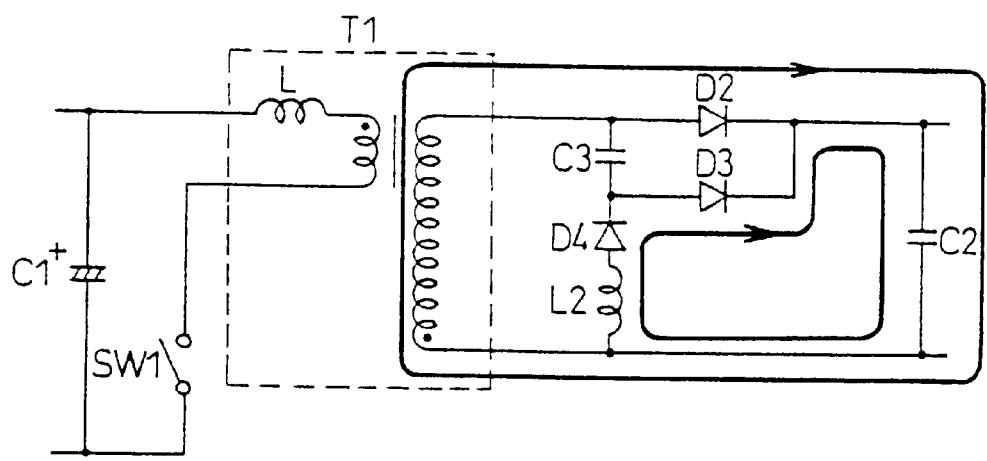
FIG. 18 is a circuit diagram showing a major part of a switching power supply being subjected to a description of a current behavior in each portion.
Figure 19:
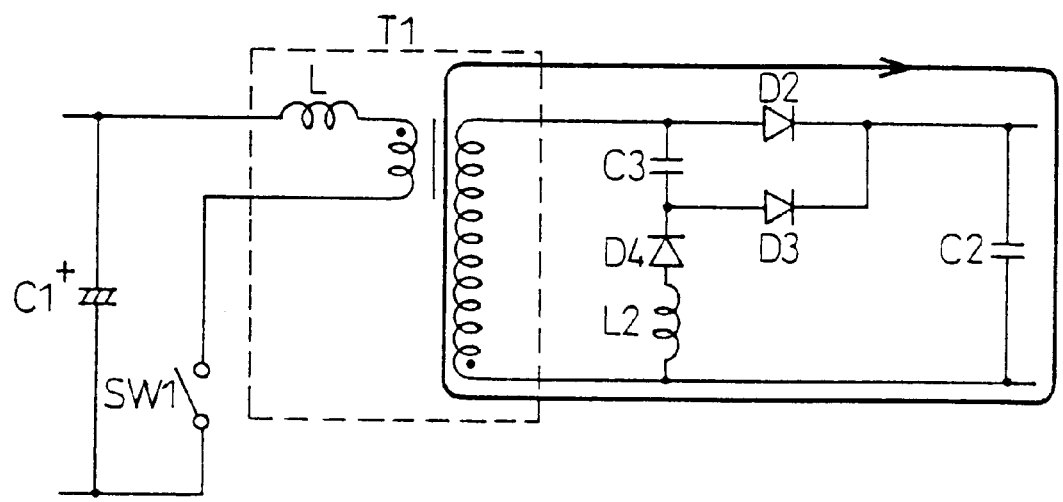
FIG. 19 is a circuit diagram showing a major part of a switching power supply being subjected to a description of a current behavior in each portion.
Figure 20:
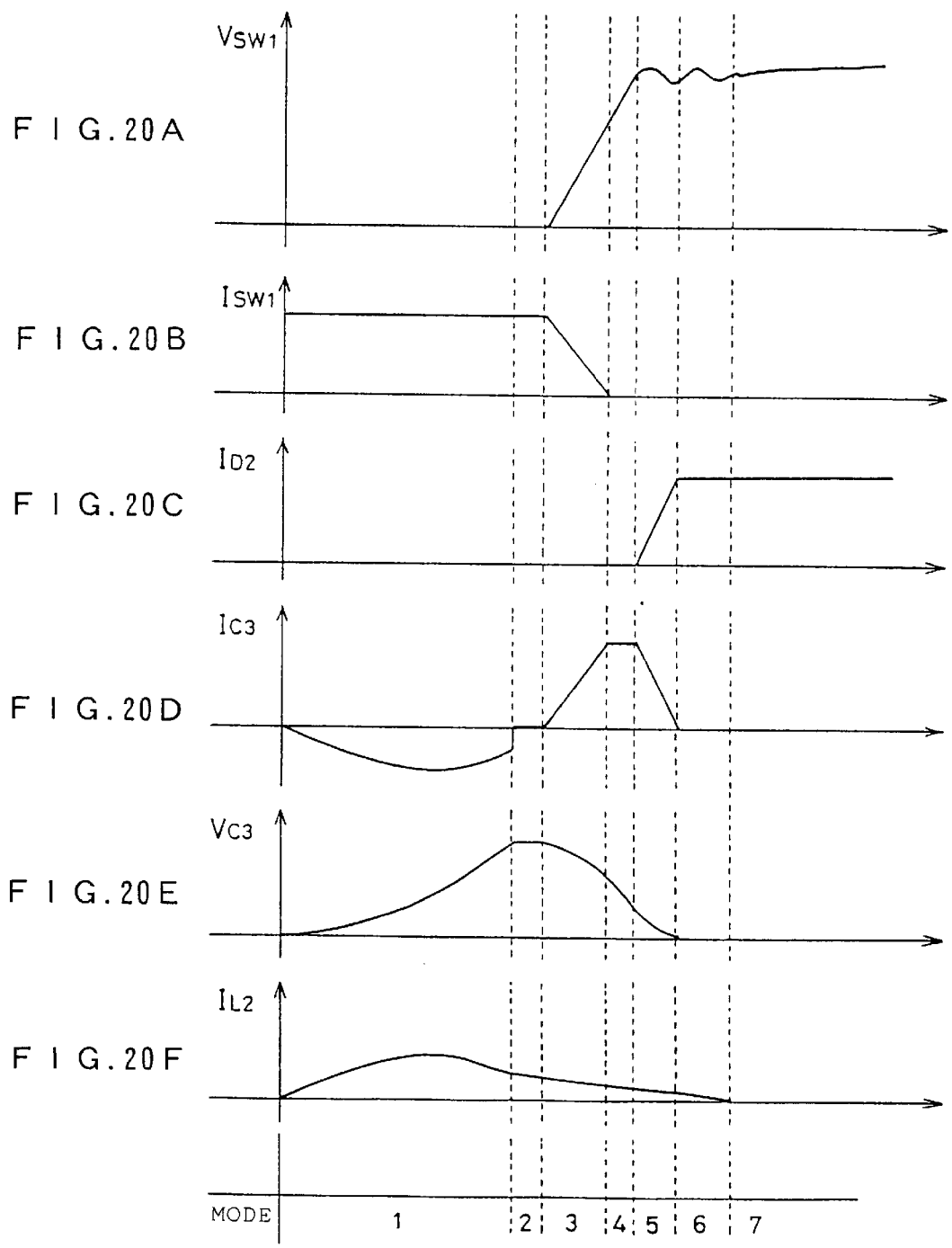
FIG. 20A is a voltage waveform diagram of a switch element SW1 shown in FIGS. 13 to 19.
FIG. 20B is a current waveform diagram of the switch element SW1 shown in FIGS. 13 to 19.
FIG. 20C is a current waveform diagram of a commutating diode D2 shown in FIGS. 13 to 19.
FIG. 20D is a current waveform diagram of a capacitor C3 shown in FIGS. 13 to 19.
FIG. 20E is a voltage waveform diagram of the capacitor C3 shown in FIGS. 13 to 19.
FIG. 20F is a current waveform diagram of a coil L2 shown in FIGS. 13 to 19.
Figure 23:
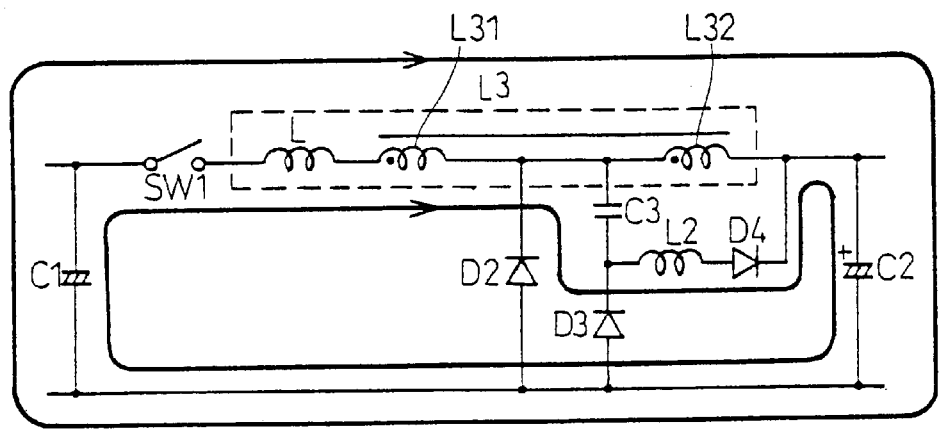
FIG. 23 is a circuit diagram showing a major part of a switching power supply being subjected to a description of a current behavior in each portion.
Figure 24:
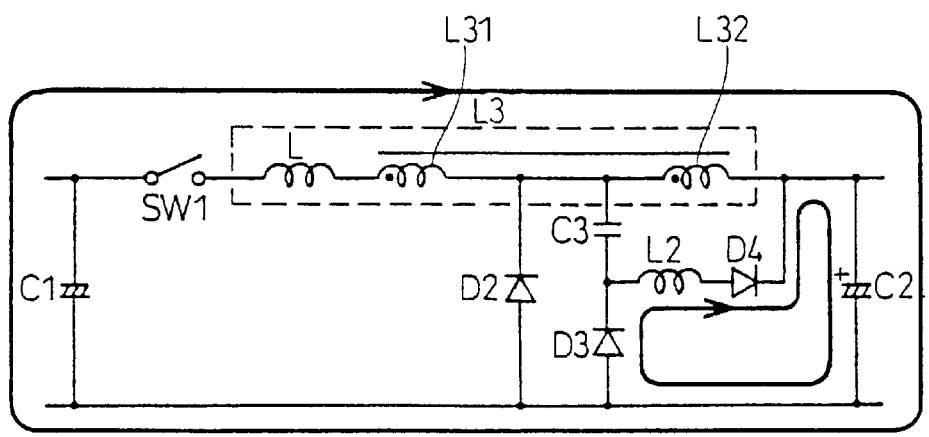
FIG. 24 is a circuit diagram showing a major part of a switching power supply being subjected to a description of a current behavior in each portion.
Figure 30:
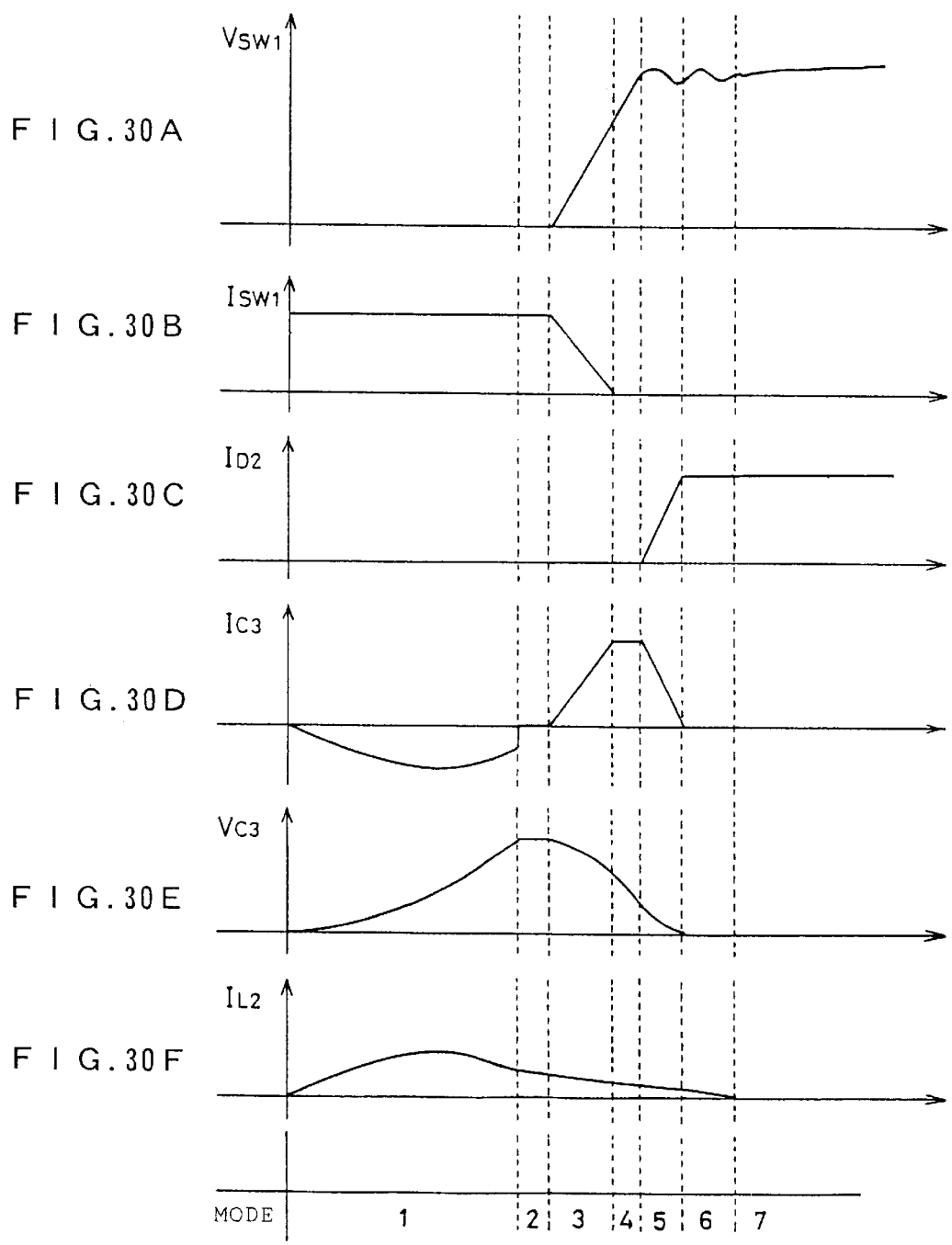
FIG. 30A is a voltage waveform diagram of a switch element SW1 shown in FIGS. 23 to 29.
FIG. 30B is a current waveform diagram of the switch element SW1 shown in FIGS. 23 to 29.
FIG. 30C is a current waveform diagram of a commutating diode D2 shown in FIGS. 23 to 29.
FIG. 30D is a current waveform diagram of a capacitor C3 shown in FIGS. 23 to 29.
FIG. 30E is a voltage waveform diagram of the capacitor C3 shown in FIGS. 23 to 29.
FIG. 30F is a current waveform diagram of a coil L2 shown in FIGS. 23 to 29.

Referring to FIGS. 12A to 12C, the voltage $V_{SW1}$ of the switch element SW1, as shown in FIG. 12A, and the current $I_{SW1}$ thereof, as shown in FIG. 12B, vary respectively. Then the current $I_{D2}$ of the commutating diode D2 varies as shown in FIG. 12C.

FIGS. 13 to 19 show modes 1 to 7 respectively.

FIGS. 20A to 20F correspond to FIGS. 10A to 10F respectively.

(Mode 1)

As shown in FIG. 13 and FIGS. 20A to 20F, the switch element SW1 is turned on at the start of mode 1. The voltage $V_{SW1}$ of the switch element SW1 is approximately zero and the current $I_{SW1}$ through the switch element SW1 is approximately constant at a predetermined value. The current $I_{D2}$ of the commutating diode D2 is zero.

In the snubber circuit 10, the current $I_{C3}$ of the capacitor C3 increases to negative, then turns to decreasing in halfway, and finally stops flowing at the end of mode 1 in which the energy storing amount of the capacitor C3 becomes in a full state. No current flows to the smoothing capacitor C2 since the commutating diode D2 is switched off.

(Mode 2)

In mode 2, as shown in FIG. 14 and FIGS. 20A to 20F, the current $I_{C3}$ is flowing since the capacitor C3 is already stored the energy and in a full charged state. The coil L2 becomes a current source by the energy stored therein and current $I_{L2}$ flows therefrom. Accordingly, a current flows to the smoothing capacitor C2 via a path consisting of the coil L2, the diode D4 and the diode D3.

(Mode 3)

In mode 3, as shown in FIG. 15 and FIGS. 20A to 20F, the switch element SW1 is turned off, the voltage $V_{SW1}$ of the switch element SW1 starts increasing, and the current $I_{SW1}$ thereof starts decreasing.

In this case, the current $I_{SW1}$ of the switch element SW1 is smoothly and gradually decreased from starting to ending of mode 3 due to the current $I_{C3}$ supplied from the capacitor C3, so that the voltage $V_{SW1}$ of the switch element SW1 increases such a gradient that a voltage ringing is suppressed from starting to ending of mode 3.

Accordingly, a current flows into the smoothing capacitor C2 via a path consisting of the secondary coil of the converter transformer T1, the capacitor C3 and the diode D3, and a path consisting of the coil L2, the diode D4 and the diode D3.

(Mode 4)

Reference is made to FIGS. 16 and 20A–20F. In mode 4, current flows to the smoothing capacitor C2 via a path formed by the secondary coil, the capacitor C3, and the diode D3 and another path formed by the coil L2, the diode D4, and the diode D3.

(Mode 5)

In mode 5, as shown in FIG. 17 and FIGS. 20A to 20F, the current $I_{D2}$ starts flowing into the commutating diode D2 while the current $I_{C3}$ of the capacitor C3 starts decreasing.

A current flows to the smoothing capacitor C2 via a path consisting of the secondary coil and the commutating diode D2, a path consisting of the secondary coil, the capacitor C3 and the diode D3, and a path consisting of the coil L2, the diode D4 and the diode D3.

(Mode 6)

In mode 6, as shown in FIG. 18 and FIGS. 20A to 20F, the current $I_{C3}$ does not flow from the capacitor C3, and a current flows to the smoothing capacitor C2 via a path consisting of the secondary coil and the commutating diode D2, and a path consisting of the coil L2, the diode D4 and the diode D3.

(Mode 7)

In mode 7, as shown in FIG. 19 and FIGS. 20A to 20F, a current flows to the smoothing capacitor C2 via a path consisting of the commutating diode D2 and the secondary coil.

In the embodiment mentioned above, like the embodiment mentioned above, the voltage ringing at the time of the turn-off of the switch element SW1 is suppressed.

In addition, since the snubber circuit 10 is provided with the capacitor C3, the diodes D3 and D4, and the coil L2, the energy loss in the snubber circuit 10 can be approximately prevented.

The snubber circuit 10 is provided in the secondary side of the switching power supply, thereby employing components in which a rated voltage and a shape dimension are small.

Referring to FIGS. 21 to 30, when a tapped inductor scheme switching power supply in accordance with another further preferred embodiment of the invention is described, the switching power supply includes a primary side smoothing capacitor C1, a switch element SW1, a tapped inductor L3, a secondary side smoothing capacitor C2, a commutating diode D2 and a snubber circuit 10.

Such operation of the switching power supply is well-known and therefore the description is omitted.

The switching power supply is provided with the snubber circuit 10. Like the embodiment mentioned above, the snubber circuit 10 has a first series circuit 20 consisting of a capacitor C3 and a diode D3 and a second series circuit 30 consisting of a coil L2 and a diode D4.

The first series circuit 20 is connected in parallel to the commutating diode D2.

In the first series circuit 20, the capacitor C3 is connected to a tapped inductor connecting side (magnetic substance connecting side) "a" in the commutating diode D2. In this case, the secondary coil connecting side "a" corresponds to the cathode side of the commutating diode D2.

The second series circuit 30 is connected between the connecting portion "b" of the capacitor C3 and the diode D3 in the first series circuit 20 and the commutating diode non-connecting side "c" in the tapped inductor L3.

Referring to FIGS. 22A to 22C, the voltage $V_{SW1}$ of the switch element SW1, as shown in FIG. 22A, the current $I_{SW1}$ thereof, as shown in FIG. 22B, vary respectively. The current $I_{D2}$ of the commutating diode D2 varies as shown in FIG. 22C.

FIGS. 23 to 29 show modes 1 to 7 respectively.

FIGS. 30A to 30F correspond to FIGS. 10A to 10F respectively.

(Mode 1)

In mode 1, as shown in FIG. 23 and FIGS. 30A to 30F, the switch element SW1 is turned on. The voltage $V_{SW1}$ of the switch element SW1 is approximately zero and the current $I_{SW1}$ of the switch element SW1 is approximately constant at a predetermined value. The current $I_{D2}$ of the commutating diode D2 is zero.

The current $I_{C3}$ of the capacitor C3 increases to negative, then turns to decreasing, and stops flowing of current into the capacitor C3 when the energy storing amount of the capacitor C3 becomes in a full state at ending of mode 1.

(Mode 2)

In mode 2, as shown in FIG. 24 and FIGS. 30A to 30F, the voltage $V_{SW1}$ and current $I_{SW1}$ of the switch element SW1 and the current $I_{D2}$ of the diode D2 are absent. Since the capacitor C3 is already stored the energy and in a full charged state, no current $I_{C3}$ flows into the capacitor C3.

(Mode 3)

as shown in FIG. 25 and FIGS. 30A to 30F, mode 3 is entirely turn-off period of the switch element SW1. At the start of mode 3, the voltage $V_{SW1}$ of the switch element SW1 starts increasing and the current $I_{SW1}$ thereof starts decreasing.

In this case, the current $I_{SW1}$ of the switch element SW1 is smoothly and gradually decreased from starting to ending of the mode 3 due to the current $I_{C3}$ supplied from the capacitor C3, so that the voltage $V_{SW1}$ of the switch element SW1 increases such a gradient that the voltage ringing is suppressed from starting to ending of mode 3.

(Mode 4) In mode 4, as shown in FIG. 26 and FIGS. 30A to 30F, a current flows to the smoothing capacitor C2 via a first path consisting of the diode D3, the capacitor C3 and another coil L32 of the tapped inductor L3, and a second path consisting of the diode D3, the coil L2 and the diode D4.

(Mode 5)

In mode 5, as shown in FIG. 27 and FIGS. 30A to 30F, the current $I_{D2}$ starts flowing into the commutating diode D2 while the current $I_{C3}$ of the capacitor C3 starts decreasing.

A current flows to the smoothing capacitor C2 via a first path consisting of the commutating diode D2 and another coil L32 of the tapped inductor L3, a second path consisting of the diode D3, the capacitor C3 and another coil of the tapped inductor L3, and a third path consisting of the diode D3, the coil L2 and the diode D4.

(Mode 6)

In mode 6, as shown in FIG. 28 and FIGS. 30A to 30F, the current $I_{C3}$ does not flow from the capacitor C3.

A current flows to the smoothing capacitor C2 via a first path consisting of the commutating diode D2 and another coil L32 of the tapped inductor L3, and a second path consisting of the diode D3, the coil L2 and the diode D4.

(Mode 7)

In mode 7, as shown in FIG. 29 and FIGS. 30A to 30F, a current flows to the smoothing capacitor C2 via a path consisting of the commutating diode D2 and another coil L32 of the tapped inductor L3.

The present embodiments can be also obtained an operating effect same as mentioned above.

Figure 31:
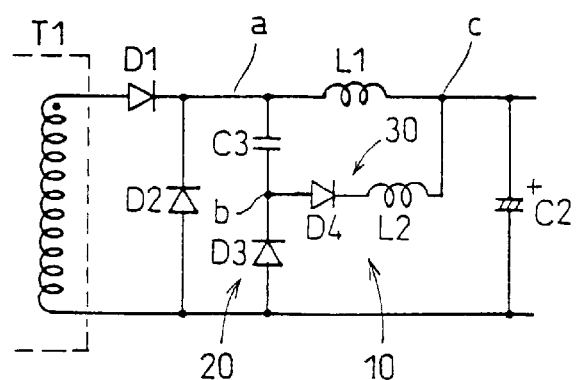
FIG. 31 is a circuit diagram showing a major part of a switching power supply in accordance with another further preferred embodiment of the invention.
Figure 32:
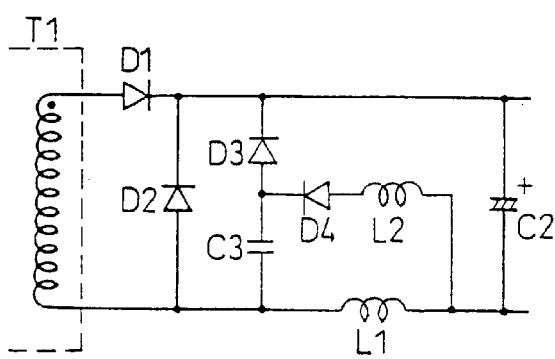
FIG. 32 is a circuit diagram showing a major part of a switching power supply in accordance with another further preferred embodiment of the invention.
Figure 33:
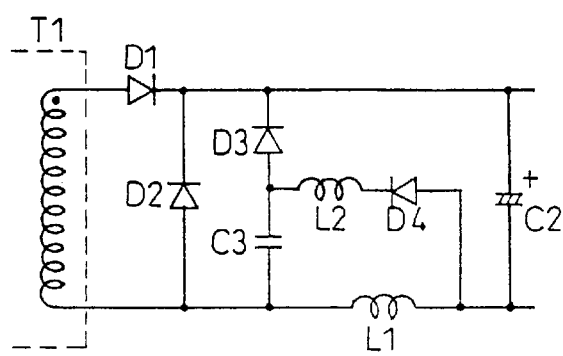
FIG. 33 is a circuit diagram showing a major part of a switching power supply in accordance with another further preferred embodiment of the invention.

Further, Examples of the forward scheme switching power supply of the invention include those shown in FIGS. 31 to 33. The invention is applicable likewise to these switching power supplies. The primary side of the converter transformer T1 is not shown in FIGS. 31 to 33. Further, in the case of FIGS. 32 and 33, the choke coil L1 is directly connected to the secondary coil of the converter transformer T1.

Examples of the fly-back scheme switching power supply of the invention include those shown in FIGS. 34 to 36. The invention is applicable likewise to these switching power supplies the primary side of the converter transformer T1 is not shown in FIGS. 34 to 36.

Examples of a tapped inductor scheme switching power supply of the invention include those shown in FIGS. 37 to 39. The invention is applicable likewise to these switching power supplies the switch element SW1 is not shown in FIGS. 37 to 39.

the invention is applied as a power transformer to a switching power supply. Nevertheless, this is by no means meant to be limiting the scope and spirit of the invention. The invention is also applicable to other power transformers, such as an inverter.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A snubber circuit provided in a power transformer having at least a switch element operating for power transformation control, a magnetic substance storing and releasing a power energy in relation to power transformation that accompanies operation of said switch element, and a commutating diode conducting by means of the power energy stored in said magnetic substance, comprising at least:
 a first series circuit in which a capacitor and a diode are connected in series; and
 a second series circuit in which a coil and a diode are connected in series, wherein:
  said first series circuit is connected in parallel to said commutating diode in a state that the capacitor of said first series circuit is connected to a magnetic substance connecting side in said commutating diode; and
  said second series circuit is connected between a connecting portion of the capacitor and the diode in said first series circuit and a commutating diode non-connecting side in said magnetic substance.

2. The snubber circuit as set forth in claim 1, wherein: said power transformer is a forward scheme switching power supply having a converter transformer; said switch element is connected in series to a primary coil of said converter transformer; and said magnetic substance is constituted by a choke coil connected directly or indirectly to a secondary coil of said converter transformer.

3. The snubber circuit as set forth in claim 1, wherein: said power transformer is a fly-back scheme switching power supply having a converter transformer; said switch element is connected in series to a primary coil of said converter transformer; and said magnetic substance is constituted by a secondary coil of said converter transformer.

4. The snubber circuit as set forth in claim 1, wherein: said power transformer is a switching power supply with a tapped inductor; and said magnetic substance is constituted by said the tapped inductor.

5. A power transformer comprising:
 a switch element operating for a power transformation control;
 a magnetic substance storing and releasing an energy in relation to power transformation that accompanies operation of said switch element;
 a commutating diode conducting by means of the energy stored in said magnetic substance; and
 a snubber circuit for suppressing voltage variations at a time of a turn-off of said switch element, wherein:
  said snubber circuit has a first series circuit consisting of a capacitor and a diode, and a second series circuit consisting of a coil and a diode; said first series circuit is connected in parallel to said commutating diode in a state that the capacitor thereof is connected to the magnetic connecting side in said commutating diode; and said second series circuit is connected between the connecting portion of the capacitor and the diode in said first series circuit and the commutating diode non-connecting side in said magnetic substance.

6. A forward scheme power transformer comprising:
 a converter transformer;
 a switch element connected in series to an end of a primary coil of said converter transformer so as to operate for a power transformation control;

a rectifying diode connected to an end of a secondary coil of said converter transformer;

a choke coil indirectly connected to the end of the secondary coil of said converter transformer through said rectifying diode or directly connected to another end of said secondary coil so as to store and release a power energy in relation to power transformation that accompanies operation of said switch element;

a commutating diode connected in parallel to said rectifying diode and the another end of the secondary coil of said converter transformer so as to conduct by the power energy stored in said choke coil; and a snubber circuit for suppressing voltage variations at a time of a turn-off of said switch element, wherein:

said snubber circuit has at least
- a first series circuit in which a capacitor and a diode are connected in series, and
- a second series circuit in which a coil and a diode are connected in series;
- said first series circuit is connected in parallel to said commutating diode in a state that the capacitor thereof is connected to said choke coil connecting side in said commutating diode; and
- the second series circuit is connected between a connecting portion of the capacitor and the diode in said first series circuit and a commutating diode non-connecting side in said choke coil.

7. A fly-back scheme power transformer comprising:

a converter transformer;

a switch element connected in series to a primary coil of said converter transformer so as to operate for a power transformation control;

a commutating diode connected to an end of a secondary of said converter transformer and conducting by a power energy stored in said secondary coil; and a snubber circuit for suppressing voltage variations at a time of a turn-off of said switch element, wherein:

said snubber circuit has at least
- a first series circuit in which a capacitor and a diode are connected in series, and
- a second series circuit in which a coil and a diode are connected in series;

said first series circuit is connected in parallel to said commutating diode in a state that the capacitor thereof is connected to said choke coil connecting side in said commutating diode; and the second series circuit is connected between a connecting portion of the capacitor and the diode in said first series circuit and a commutating diode non-connecting side in said secondary coil.

8. A power transformer with a tapped inductor, comprising:

a tapped inductor;

a switch element connected in series to one coil of said tapped inductor so as to operate for a power transformation control;

a commutating diode connected to another coil of said tapped inductor so as to conduct by a power energy stored in the another coil;

a snubber circuit for suppressing voltage variations at a time of a turn-off of said switch element, wherein:

said snubber circuit has at least
- a first series circuit in which a capacitor and a diode are connected in series, and
- a second series circuit in which a coil and a diode are connected in series;

said first series circuit is connected in parallel to said commutating diode in a state that the capacitor thereof is connected to said another coil connecting side of said tapped inductor in said commutating diode; and the second series circuit is connected between a connecting portion of the capacitor and the diode in said first series circuit and a commutating diode non-connecting side in said another coil of said tapped inductor.

9. The snubber circuit as set forth in claim 1, wherein:

said first series circuit is directly connected in parallel to said commutating diode in a state that the capacitor of said first series circuit is directly connected to a magnetic substance connecting side in said commutating diode.

10. The snubber circuit as set forth in claim 1, wherein:

said second series circuit is directly connected between a connecting portion of the capacitor and the diode in the first series circuit and a commutating diode non-connecting side in said magnetic substance.

* * * * *